United States Patent [19]
Bak et al.

[11] 3,917,455
[45] Nov. 4, 1975

[54] EQUIPMENT FOR THE AUTOMATIC DETERMINATION OF THE CHEMICAL COMPOSITION OF LIQUID BY SAMPLING AND BY ADDING OF REAGENTS

[75] Inventors: Béla Bak; Ferenc Engard; József Szoke, all of Budapest, Hungary

[73] Assignee: MTA Központi Fizikai Kutató Intezet, Budapest, Hungary

[22] Filed: May 10, 1974

[21] Appl. No.: 468,882

[30] Foreign Application Priority Data
May 18, 1973 Hungary .......................... MA 2475

[52] U.S. Cl. ............... 23/253 R; 23/259; 134/22 R; 134/37; 356/246
[51] Int. Cl.² ............. G01N 33/16; G01N 21/24; G01N 1/14
[58] Field of Search .............. 23/230 R, 253 R, 259; 356/246, 39

[56] References Cited
UNITED STATES PATENTS

| | | | |
|---|---|---|---|
| 3,432,271 | 3/1969 | Wasilewski | 23/253 R |
| 3,533,744 | 10/1970 | Unger | 23/253 X |
| 3,660,638 | 5/1972 | Oberli | 23/253 X |
| 3,728,079 | 4/1973 | Moran | 23/253 R |
| 3,799,744 | 3/1974 | Jones | 23/253 R |
| 3,802,782 | 4/1974 | Natelson | 23/253 R |
| 3,814,582 | 6/1974 | Rohrbaugh et al. | 23/253 X |

*Primary Examiner*—R. E. Serwin
*Attorney, Agent, or Firm*—Young & Thompson

[57] ABSTRACT

Equipment for the automatic determination of the chemical composition of liquids by sampling and by adding reagents, in which a plurality of sample cups are arranged in each of a plurality of magazines. The magazines move tangentially of a rotary table about whose periphery are arranged a plurality of processing containers. A transfer device reciprocates vertically and also reciprocates radially of the table to transfer liquid from the cups to the containers. The table rotates stepwise and reagents are added to the samples in the containers. Finally a suction pipe transfers liquid from the containers to the analyzer, at the same time that light shines through the cup from which the sample originated, thereby simultaneously to analyze and identify the specimen. The magazines move first in a stack perpendicular to their length, then in single file lengthwise, and finally in the reverse direction in a stack perpendicular to their length, as they are successively introduced into, moved through and ejected from the equipment.

6 Claims, 1 Drawing Figure

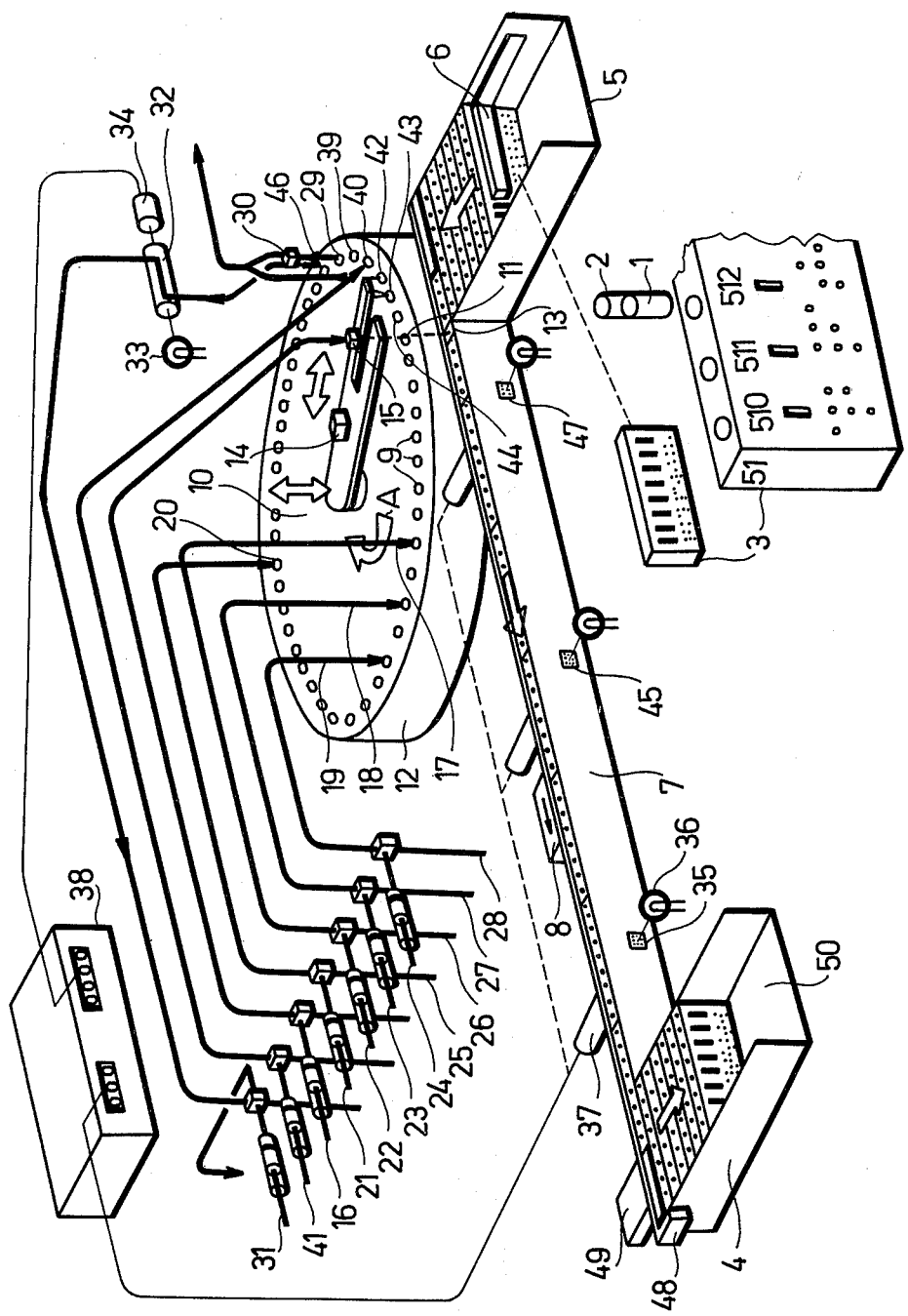

EQUIPMENT FOR THE AUTOMATIC DETERMINATION OF THE CHEMICAL COMPOSITION OF LIQUID BY SAMPLING AND BY ADDING OF REAGENTS

The equipment according to the invention serves for the determination of the chemical composition of liquids, e.g. blood serum constituents, by taking a sample of the liquid to be tested and by adding reagents.

For chemical analyses carried out in series, chemical analyzers are used to an increasing extent which carry out automatically, without any human intervention, the sampling, the adding of reagents, the provision for the suitable conditions of reactions occurring in the course of analyses, the measurement, the indication and printing of the data. These automatic chemical analyzers provide in addition to the elimination of the subjective human perception, for well-reproducible measurement conditions and for the high accuracy of measurement. Such devices are used e.g. in hospitals and clinics where measurements in large number must be carried out in a short time.

For the above routine analysis of solutions a selective reaction may be brought about by adding additives of various kinds and quantities to the sample of definite volume, the product of which may be measured by means of a suitable physico-chemical method, in a convenient manner, with high accuracy, and thus, the concentration of the given component can be determined. Owing to the great variety of measuring devices and of the possible reactions, the volume of the taken sample and the added reagents used for the various analytical processes are varied within a wide range. This consideration determines the design of the current programmable chemical analyzers applicable for the solution of different analytical problems.

With the equipment according to the invention, a constant value has been taken for the volume of the sample, of the added reagent and of the rinsing dispenser and the precision volume-setting micrometers of the usual dispensers have been eliminated in order to render possible the assembly of the sampling and dispensing system of the equipment with the use of inexpensive, uniform elements suitable for mass production. With the equipment having constant sampling volume, reagent volume and rinsing dispenser volume, the analytical methods and the concentration relations of the used reagents and the reaction conditions, respectively, are determined so that the available variable total volume could give results of suitable accuracy due to the simultaneous operation of four to five dispensers.

The experience gained with the equipment is advantageouos, the operation of the equipment is simple, no volume adjustment and calibration problem occurs, the equipment can be quickly re-programmed, it has a high accuracy of reproduction and for servicing, the interchangeable dispensers of identical volume are extremely convenient.

Several types of automatic chemical analyzers are known, of which a more advanced variation is disclosed in the U.S. Pat. No. 3,660,638 (Oberli) where the equipment is actuated by card control. The samples to be tested are manually loaded into a stepwise rotating specimen magazine forwarding the sample to the sampling position. From the specimen magazine in the sampling position, the samples are taken stepwise by means of the sampling means, which transfer a specified quantity of the sample into the processing container arranged in the first position of the conveyor belt. Into the reaction cup moving stepwise on the conveyor belt, five different reagents can be added in the following five positions of the conveyor belt. The card accompanying the sample indicates the reagent to be added to the sample in question. This card is punched before the test by means of a manual card punching unit, corresponding to the test to be carried out. In the card-reading unit the card moves synchronously with the reaction cup containing the sample and arranged on the conveyor belt. If the hole on the card is sensed by a detector by the aid of a light source, then reagent is fed into the reaction vessel. It is very important that the accompanying card should be located in the card magazine in the same order as the associated sample is arranged in the sample holder. At the end of the conveyor belt the measuring operation is carried out and then, the measurement result is printed under the suitable heading of the card accompanying the sample.

This otherwise advanced equipment has the following drawbacks:

1. In case of a failure, the operation of the card feeder is stopped, spoiling the running determinations due to the resulting time loss. Therefore, the equipment requires constant supervision.
2. The processing containers are not provided with identification numbers, thus the synchronous movement of cards and samples must be manually ensured.
3. The temperature of the reaction cups cannot be regulated.
4. The reaction cups must be made of optical material and their optical purity must be manually adjusted.
5. With this equipment either reactions of very short duration can be measured or the measurement becomes very slow.
6. Experience shows that the multi-channel equipment is not advantageous for laboratory purposes expecially where the channels out of use cause time and work loss. From the point of views of the laboratory, the quick measurement is favourable, that is, how many determinations per hour can be carried out with the equipment.
7. For the data processing with computer, the equipment of Oberli puts the measuring result on punched cards, therefore a card punching unit is also required, rendering the equipment very expensive.

The aim of the present invention is the development of a single-channel automatic chemical analyzer corresponding better than the hitherto known devices to the requirements, and with which the above mentioned drawbacks does not occur.

The object of the invention is the provision of equipment for automatic testing of the composition of liquids by taking a sample of the liquid to be tested and by adding reagents, which has liquid sample cups, a device forwarding the cups, sample pick-up, dispenser, reagent receiver, an electronic timing device, measuring device consisting of arithmetical unit and of digital display and of an alphanumeric printer and of a memory unit.

The essence of the invention consists in that the equipment has specimen magazines receiving the sample cups and provided with transilluminable code symbols, a stepping channel forwarding stepwise in straight line the sample magazines, a rotary table rotating stepwise the reaction cups, arranged tangentially with respect to the sampling position of the stepping channel, a sampling device protruding from the centre of the table to above the sampling position, provided with sampling devices, moving up and down, a dispenser provided with cleaning device, as well as a measuring device consisting of mixture exhauster, a through-flow cuvette, of light source and a measuring detector.

With an advantageous embodiment of the invention, the channel forwarding the specimen magazines (processing containers) has a spring-actuated input part, a middle part provided with a stepping device and an output part provided with a push-out device.

In a further advantageous embodiment of the invention, in one or more points in the middle of the channel forwarding the specimen magazine, windows are provided which haul light sources and code reading units.

In another advantageous embodiment of the invention the rotary table has a liquid space regulated by means of a temperature controller, and a stepping motor.

In an advantageous embodiment of the invention the device cleaning the reaction cups has exhausting, water dispensing and air drying units.

In another advantageous embodiment of the invention the measuring device has an electronic timer device.

In another advantageous embodiment of the equipment according to the invention, the equipment has sample dispensers, reagent dispensers and water dispensers of fixed volume.

In a further advantageous embodiment an electric typewriter - teletype - is connected to the equipment.

An exemplified embodiment of the equipment according to the invention will be described in more detail with reference to the drawing.

The liquid sample cups 2 containing the samples 1 - e.g. blood serum - prepared for the test are arranged in a sample magazine 3 of rectangular body shape, made of metal, containing, according to our example, eight sample cups, in which an identification number coded in the octal system is attached to each sample cup. The identification numbers of the sample cups can be read off in a photoelectric way from the sample magazine when measuring.

The sample magazines 3 filled with samples to be tested are arranged one after the other in the input channel 5 of the device 4 forwarding the sample magazine. Here, the spring-actuated device 6 pushes the sample magazines 3 into the stepping channel 7 where the stepping device 8 moves them at the beginning of the measuring cycle by a step (⅛ length) forward.

In the present example the chemical reaction takes place in the processing containers 9 of 2500 $\mu$lit volume, made of P.T.F.E. (Teflon), of which expediently 45 are arranged on the rotary table 10. The rotary table 10 carries out a unit rotation (360/45 = 8°) at each step in the direction of arrow A, by means of a stepping motor not shown in the drawing. The processing containers 9 are immersed into a liquid tank of regulated temperature, in which the temperature of the liquid is stabilized with an accuracy of 0.1 °C by means of a temperature controller.

The ninth position of the stepping channel 7 is the sampling position 13, where the first sample cup arrives at the beginning of the elementary step. When sampling, the sample pick-up device 14 protrudes at each elementary step above the sampling position 13 and the sampling snout 15 is plunged into the sample cup 2 which is in the sampling position 13. It pumps therefrom liquid of 50 $\mu$lit volume, then it emerges from the sample cup 2 and returns to above the processing container 11 which is in the first position of the rotary table 10. The sampling snout 15 is plunged into the processing container 11, dispenses therein the taken sample by means of the dispenser 16 of the sample pick-up 14 and then, the dispenser 16 rinses the sampling snout 15 which now emerges again from the processing container 11. The first elementary step (8°) is thereby finished.

At the beginning of the second elementary step (8°) the stepping device 8 in the stepping channel 7 forwards again by a step the sample magazine 3 and simultaneously the rotary table 10 carries out a unit rotation with the aid of the stepping motor so that the sampling snout 15 of the sampling device 14 supplies into the second processing container the sample taken from the second sample cup. The sampling is thus continuously repeated until the end of the eighth elementary step, when the sampling has been effected already from all the eight sample cups of the sample magazine 3 and the first eight reaction cups already contain the appropriate samples. In the meantime, the spring-actuated device 6 already pushed the second sample magazine 3 into the stepping channel 7 and thus, the first sampling occurs now from the second sample magazine accurately as said above.

The process is repeated at each elementary step, while the stepping device 8 moves forward the sample magazines 3 in the stepping channel 7 by a step each at the beginning of the elementary step and the stepping motor moves forward by a step the rotary table 10 together with the processing containers.

With the embodiment of the equipment shown as example, at most five kinds of reagents may be added to a sample into the processing container. The reagent dispensers feed 500 $\mu$lit of reagent at each elementary step. Each dispenser has a pneumatic valve, at one position of which the dispenser pumps reagent of exactly 500 $\mu$lit volume from the receiver and at the other position of the pneumatic valve the dispenser supplies the reagent into the processing container. The pneumatic valve and the dispenser are controlled by a solenoid valve by means of a piston, using compressed air. The reagent dispenser is actuated by means of an electric switch, inserted into the circuit of the solenoid of the magnet valve. The switch being switched on, the associated dispenser operates, when being switched off, however, no feeding occurs. The feeding of the first reagent occurs through the reagent feeding pipe 17, that of the second reagent through the reagent feeding pipe 18, that of the third reagent through the reagent feeding pipe 19, finally that of the fourth reagent through the reagent feeding pipe 20. The pumping of reagents is effected by means of the reagent dispensers 21–24, through the suction pipes 25–28.

The reagent being fed and the reactions being finished, the measurement is carried out in the fourtieth position of the rotary table 10, in this position 29 the suction pipe 30 of the photometer is connected to the processing container, on which a dispenser of ml-scale 31 transfers intermittently the reaction mixture through the unidirectional sucking cuvette 32. The measurement is thus carried out always with a quiescent liquid by means of the light source 33 and the detector 34.

In the fourtieth position of the stepping channel 7 the identification number of the sample cup 2 is read from the sample magazine 3 through the window 35 of the stepping channel by means of the light source 36 and the detector 37. The cipher coded according to the total system is transformed into a decimal cipher by means of a decoder. The measuring result and the identification number of the sample cup and of the test carried out can be shown on the measuring device 38, or can be printed on a printer. The measuring device 38 contains the various electronic actuating means, such as amplifier, decoding, electronic timing, arithmetic, memory, indicating and printing units. An electric typewriter (teletype) can also be connected to the equipment, thus the measuring results and the identification numbers can be directly transferred to punched tape, being applicable directly to data processing with computer or to data telecommunication.

The measurement being finished, the processing container vessels are cleaned in four further positions of the rotary table 10. The residual reaction mixture is pumped at the position 39 through a pipe from the processing container and in the next position water is fed through the water feed pipe 30 by means of the water dispenser 41. Then, in the next position, at 42, the water is pumped and in the position 43 air is blown through a special nozzle and the processing container is completely dried. The last (45th) position of the rotary table 10 is the preparatory position 44.

The timing and the sequence of the processes are provided for by the electronic timer.

By the selection of the time programs, one-, two- and three-cycle measurements can be effected by means of the equipment.

With the one-cycle measurement, as already described, each sample cup contains another sample and at each elementary step a new measurement is carried out. The sample magazine 3 and the rotary table 10 move forward by one step at each elementary step.

With the two-cycle measurement, the sample magazine 3 moves forward by a step only at each second elementary step. In case of two-cycle measurement, four different measurements can be carried out:

a. With the exclusive reagent measurement, the sample magazine 3 contains alternately water and sample. The measurement is carried out when the reagent changes its colour during the measurement.

b. With the parallel measurement, each sample cup of the sample magazine 3 contains another sample. With this measurement a double sampling is effected, that is the equipment carries out twice the same determination. In case of particular measurements, this process is carried out in order to prove the reproducibility. The result is given by the average of two measurements.

c. With the exclusive sample measurement, a double sampling is carried out, but at the first elementary step, instead of a reagent, it feeds water. If the colour of the sample is of decisive character, the measurement is carried out for the correction of the individual sample.

d. With the two-channel measurement, each sample cup of the sample magazine 3 contains a different sample. At the first elementary step the equipment feeds the reagent of one reaction, at the second elementary step, however, the reagent of the other reaction.

This two-channel measurement provides for the determination of two parameters. With the two-cycle measurements the reading of the identification number of the sample cup 2 from the sample magazine 3 occurs at the twentieth position of the stepping channel 7 through the window 45 of the stepping channel 7.

With the three-cycle measurement, triple sampling is carried out, thus the sample magazine 3 moves forward by one step in the stepping channel 7 only at every third elementary step. In case of this operational method the measurement is carried out in the thirty-ninth position of the rotary table 10 at the position 46, whereas the reading of the identification number of the sample cup 2 from the sample magazine 3 occurs in the thirteenth position of the stepping channel 7 through the window 47 of the stepping channel 7.

The sample magazine 3 is actuated at the end of the stepping channel 7 by means of the limit switch 48 with the push-out device 49 and pushes the sample magazine 3 into the output channel 50.

The invention is accompanied by the following advantages.

1. The code symbols applied on the sample magazines made of metal are in rigid connection with the sample cups and processing containers, the automatic reading being thus unambiguously ensured.

2. The arrangement of the sample magazines in the input channel, the pushing-in of the sample magazines into the input channel, the sampling, the code reading and the pushing-out of the sample magazines into the output channel occur fully automatically and require no supervision.

3. If sampling dispensers, reagent dispensers and rinsing dispensers of exclusively fixed colume are used in the equipment, no adjustment error may occur with the dispensers and at the same time, the dispensers are inexpensive and interchangeable.

4. The cleaning device completely cleans the processing containers made expediently of Teflon, using the pumping, rinsing and air-drying operation, requiring no manual intervention. The equipment can be thus continuously used without the limitation of number of samples.

5. The relatively large rotary table and the suitably chosen rotational velocity render possible the effectuation of reaction tests of the longest duration.

6. The processing containers are immersed in a liquid tank of regulated temperature, therefore the reations do not depend on the temperature.

7. The dispenser of 1 ml capacity used with the photometer pumps intermittently the reaction mixture through the unidirectional through-flow cuvette so that the measurement is carried out always with a quiescent liquid.

8. An electric typewriter (teletype) can be connected to the equipment and the produced punched tape can be directly used for the data processing with computer or to the data telecommunication.

What we claim is:

1. Equipment for the automatic determination of the chemical composition of liquids by sampling and by adding reagents, comprising a plurality of liquid sample cups arranged in sample magazines with a plurality of said cups in each of said magazines, a rotary table, means for rotating said table stepwise, plurality of processing containers arranged in a peripheral series about said table, means to forward said magazines tangentially of said table, means movable vertically and also radially of said table for transferring liquid from said cups to said containers, means to dispense reagents into said containers, means to effect a measurement of the chemical composition of the liquids in the containers, means to remove liquids from the containers and to rinse the containers with water and air dry the containers, said removing means comprising suction pipe, said determining means receiving liquid from said suction pipe, means for shining light through said cups on said forwarding means that have moved beyond said table, and for reading the light that shines through said cup to identify the cup through which said light is shining, said light-shining means being so positioned relative to said forwarding means that the liquid in said determining means was drawn from the cup through which said light is shining.

2. Equipment as claimed in claim 1, said rotary table having a liquid space therein into which said containers extend, and means for maintaining said liquid at a predetermined temperature.

3. Equipment as claimed in claim 1, and means for simultaneously recording data from said determining means and from said reading means.

4. Equipment as claimed in claim 1, said magazines being elongated and said cups being disposed in a series along the length of each said magazine, said forwarding means comprising means for forwarding a stack of said magazines toward said table with the longest sides of said magazines against each other, and then for forwarding the magazines past the table in the direction of the length of the magazines and in single file, with said magazines passing between said light-shining means and said reading means in single file.

5. Equipment according to claim 4, and means for receiving said single file magazines and for reforming said magazines into a stack with the longest sides of said magazines in contact with each other, and for moving said stack away from said single file.

6. Equipment according to claim 1, in which said liquid passes through said determining means in one direction only.

* * * * *